2,793,214

CHLORINATED COPPER PHTHALOCYANINE

Harris Holtzman and Eric Simon, New York, N. Y., assignors to Ansbacher-Siegle Corporation, New York, N. Y., a corporation of New York No Drawing. Application December 4, 1953, Serial No. 396,328

6 Claims. (Cl. 260—314.5)

The present invention relates to an improved and novel process for the manufacture of halogenated phthalocyanine coloring matters. More particularly it relates to an improved process of manufacture of chlorinated copper phthalocyanine.

In our copending application Serial Number 171,228 filed June 29, 1950, on which Patent No. 2,662,085 was issued on December 8, 1953, it was pointed out:

The chlorinated phthalocyanines generally make excellent green pigments possessing bright shade, high tinctorial strength, good opacity and outstanding resistance to exposure to light, heat, dilute acid, weak and strong alkalies and the organic solvents most commonly used in pigment application. Chlorinated copper phthalocyanine, particularly, has found extensive application for coloring paints, printing inks, plastics, floor covering compositions, paper and the like.

The phthalocyanines have been characterized (see R. P. Linstead and others, Journal of the Chemical Society (London), 1934, (1016–1039) as resonating heterocyclic structures in which four aromatic rings are combined by extracyclic nitrogen atoms, the whole forming a very stable coordination complex with various metals, such as copper, iron, nickel, etc. The chlorinated copper phthalocyanines can be represented by the formula

$$[(C_6H_4{-n}Cl_n)C_2N_2]_4Cu$$

where $n$ represents the number of chlorine atoms substituted in each benzene ring. Introduction of chlorine atoms into the phthalocyanine molecule leads to progressively greener shades with increased chlorine content. For instance, the commercially used copper phthalocyanine blue is converted finally into a yellowish green pigment by substitution of most or all of the aromatic hydrogens by chlorine atoms. The theoretical limit of such substitution is reached when 16 aromatic hydrogen atoms have been replaced by chlorine atoms and it has previously been thought that the practical limit is reached when 13 aromatic atoms have been so replaced.

Furthermore, it has been demonstrated that, in order to obtain desirable green shades, it is necessary to achieve a high degree of chlorination of the molecule with introduction of at least 13 atoms of chlorine per phthalocyanine molecule. In the prior procedures for the direct chlorination of phthalocyanine, the most highly chlorinated phthalocyanines obtained rarely attain to 12 to 13 atoms of chlorine to the molecule, and to achieve this result drastic conditions involving not only high temperatures and high pressures but also excess of chlorine are required.

The chlorinated copper phthalocyanines have heretofore been made by a number of different processes, practically all of which are cumbersome and costly, generally requiring extensive purification procedures to obtain a satisfactory product. These prior processes have been carried out at high temperatures of the order of from 150° C. to 300° C. and sometimes under pressure. In order to attain these high temperatures, the use of fused solids or liquids under high pressures have been resorted to. When such temperatures are used, numerous by-products are formed which lower the yield and require expensive purification procedures.

Indeed, processes have been described for direct chlorination in the presence of various reaction media which are liquid at the high reaction temperatures and pressures employed and the product is subsequently separated from the reaction medium and purified. Examples of such media suggested for this purpose are: Sulfuryl chloride, thionyl chloride, sulphur dichloride, nitrobenzene, phthalic anhydride, aluminum chloride, sodium chloride and others. It has also been suggested to use tetrachlorophthalic anhydride as starting material, condensing this with nitrogen derivatives such as urea in inert high boiling organic solvents in the presence of metal salts and catalysts. But in this process, as in the others referred to, there occurs considerable formation of by-products which lower the yield and require expensive purification procedures.

That application then proceeds to disclose and claim an improved process for the chlorination of copper phthalocyanine in which a solution of copper phthalocyanine in chlorsulfonic acid, acting as a reaction medium, has chlorine passed through it in the presence of a chlorination catalyst at relatively low temperatures. The improved process therein disclosed and claimed has resulted in the successful commercial production of chlorinated copper phthalocyanine of high chlorine content, 14 to 15 atoms of chlorine, without the production of undesirable by-products and, therefore, without the necessity of using complicated and costly purification procedures.

However, despite the fact that the process disclosed and claimed in said application and patent is highly successful commercially, there are some ways in which that process may be substantially improved upon when used in commercial production.

The subject matter of the present invention is to disclose and claim improvements upon that process. The improvements herein disclosed and claimed arise chiefly because of those characteristics and properties of chlorsulfonic acid which are completely separate and independent from the properties which make it a highly successful and efficient reaction medium in the chlorination of copper phthalocyanine. Those characteristics and properties of chlorsulfonic acid render it a potentially dangerous chemical requiring precautions to minimize the hazards of handling it under the conditions encountered in production on a commercial scale.

Commercial chlorsulfonic acid is relatively stable and poses no special storage problem other than those usually encountered in the handling of corrosive acids provided it is stored in a cool dry location. However, special care is required to keep moisture from contact with chlorsulfonic acid because of its tendency to fume in the presence of moisture and thus to produce corrosive gases. Furthermore, due to its rapid decomposition with the release of hydrogen chloride gas with explosive violence when diluted with water, utmost care and extensive precautions must be taken when it is used in a process on commercial scale in order to protect personnel and equipment, such as, the use of fume removal equipment when it is diluted with water. Such care and precautions add substantially to the cost of carrying out the process.

Further, since chlorsulfonic acid decomposes upon dilution in water it is not possible, when it is used as a reaction medium in the process disclosed and claimed in our above mentioned application and patent, to recover it for further and repeated use therein.

It is therefore an object of the present invention to improve the process disclosed and claimed in our above mentioned application by the use therein of a reaction medium which does not have the above mentioned collateral disadvantages of chlorsulfonic acid.

It is a further object of the present invention to improve the process disclosed and claimed in our above mentioned application and patent by the use therein of a reaction medium which is relatively safe under all conditions normally encountered in the carrying out of said process on a commercial scale.

It is a further object of the present invention to improve the process disclosed and claimed in our above mentioned application and patent by the use therein of a reaction medium which does not decompose upon dilution with water.

It is a further object of the present invention to improve the process disclosed and claimed in our above mentioned application and patent by the use therein of a reaction medium which may be recovered for further and repeated use.

It is a further object of the present invention to improve the process disclosed and claimed in our above mentioned application and patent by the use therein of a reaction medium which increases the overall efficiency of said process when carried out on a commercial scale.

Further objects and advantages of the present invention will be obvious upon reading the specification and appended claims. Our invention is illustrated but not limited by the examples given below.

Research and experimentation in the search for a reaction medium to replace chlorsulfonic acid as a reaction medium in the chlorination of copper phthalocyanine which would perform the reaction medium function as well as chlorsulfonic acid but which would combine with that function the collateral advantages over chlorsulfonic acid hereinabove set forth resulted in the discovery of several organic acids which meet these requirements.

All of the substances considered and tested as reaction media which combined successful operation as such and the other advantageous results recited herein had in common the following properties and characteristics: They are all organic sulfonic acids. They have no oxidizing properties and do not form an oxidizing system under the condition of our chlorination process. They have melting points below 120° C. They have boiling points above 120° C. They do not decompose upon dilution with water. Among these acids are benzenesulfonic, benzenedisulfonic, para-bromo benzenesulfonic, para-chloro benzenesulfonic, ortho-nitro benzenesulfonic, meta-nitro benzenesulfonic, ortho toluene sulfonic, para toluenesulfonic, 6-chloro, 3-nitro benzenesulfonic, alpha naphthalenesulfonic, beta naphthalenesulfonic, carboxy benzenesulfonic and their chlorination products.

It has been found that in some cases it is advantageous to use a mixture of two or more of these acids particularly where the melting point of the resultant reaction medium is lowered by such mixing. In many cases isomeric mixtures of two or more of these acids are commercially available and may be used.

The acids of this group are generally hygroscopic and it is important to start the process with materials free of moisture and to keep the reaction medium moisture-free during the chlorination process to prevent oxidation and other side reactions.

In general the process comprises the direct addition of chlorine to a substantially homogeneous solution of copper phthalocyanine in one of the organic sulfonic acids of this group in the presence of various chlorination catalysts. In the process copper phthalocyanine is charged into any one of or a combination of the acids of this group. This enables the use of lower temperatures, thus reducing the possibility of side reactions including the partial destruction of the phthalocyanine molecule. The reaction may be conducted at a range of temperatures between 60° C. and 120° C. Preferably chlorine is passed through at a temperature not above 120° C. and the chlorination takes place mainly at temperatures below 100° C. although the temperature may for a short time be raised gradually to a somewhat higher temperature to complete the reaction. The green chlorinated product is isolated by drowning the said solution into water or a dilute aqueous alkaline solution kept at low temperature. The pigment is then filtered, washed thoroughly and dried, the resulting compound containing from 12 to 15 atoms of chlorine per molecule and no atoms of sulfur per molecule.

The acid comprising the reaction medium may be recovered by any suitable well known method, such as, by neutralizing the solution with sodium hydroxide, filtering out the pigment and then acidifying and concentrating the filtrate thus recovering the acid of the reaction medium as such or in a chlorinated form which is suitable for re-use as a reaction medium. As is shown in the examples below this recovery may also be accomplished by evaporation.

The catalysts employed are not relied upon as a source of chlorine for the chlorination of the phthalocyanine molecules for they may be recovered at the end of the process in either the same condition in which they were originally added or in a chlorinated stage. In fact, some suitable catalysts are chlorine free. We may group some suitable catalysts as follows:

Group I. Chlorine free catalysts: Sulfur, iodine and bromine.

Group II. Non-metallic chlorides: Sulfur monochlorides, sulfur dichloride and iodine chlorides.

Group III. Metallic chlorides: Ferric chloride, aluminum chloride, antimony chloride and cupric chloride.

We may add to this list any other chlorination catalyst.

The following specific examples are given by way of illustration:

Example I 60 parts by weight of copper phthalocyanine are charged with agitation into 600 parts by weight of commercial toluenesulfonic acid isomer mixutre which is completely fluid at 60° C. and which has been previously treated to remove any moisture therefrom, the mixture is kept for about two hours at 80° C. while agitated to provide a homogeneous mixture. The temperature is reduced to 50 C. and then 30 parts by weight of sulfur monochloride and 6 parts by weight of iodine monochloride are added. Chlorine is then passed through the reaction mass for two hours after which its temperature is raised slowly during a six to eight hour period to 110° C. and kept at that temperature for at least one hour. When the desired degree of chlorination has been reached the batch is poured into a dilute aqueous solution of sodium hydroxide. The resulting slurry is heated for two hours at 80° C. to insure complete conversion of the toluenesulfonic acids to their water soluble sodium salts. The pigment in its highly subdivided form is then filtered off. Analysis shows the pigment to contain 45% chlorine corresponding to over 12 atoms of chlorine per molecule with a yield being 85% of the theoretical yield. The toluenesulfonic acids which have become partially chlorinated are then recovered by precipitating them from the filtrate in their crystalline hydrated form by the slow addition of 230 parts by weight of 66° Baumé sulfuric acid. The filtered crystals are heated to 150° C. to drive off the water of crystallization. The resulting acids are ready for re-use as a reaction medium for another chlorination.

Example II

The process of Example I was followed with the single exception that instead of the use of commercial toluenesulfonic acid isomer mixture the partially chlorinated toluenesulfonic acid recovered by the process of Example I was used as the reaction medium.

Example III 70 parts by weight of copper phthalocyanine are charged with agitation into 700 parts by weight of anhydrous benzenesulfonic acid at 80° C. After the mixture has become completely homogeneous 10 parts by weight of antimony trichloride and 30 parts by weight of sulfur dichloride are added. Chlorine is then passed through the reaction mass for four hours during which the temperature is slowly raised to 120° C. Passage of the chlorine through the reaction mass is continued until the desired degree of chlorination is obtained and then the batch is poured into water held at 60° C. This is thoroughly stirred for two hours during which time the temperature is raised to 80° C. to insure complete solution of the benzenesulfonic acid. The finely subdivided pigment is then filtered off and the partially chlorinated benzenesulfonic acid recovered by evaporation of the filtrate. Analysis shows the pigment to contain 47.2% chlorine corresponding to over 14 chlorine atoms per molecule with a yield being 95% of the theoretical yield.

*Example IV*

The process of Example III was followed with the single exception that instead of the use of anhydrous benzenesulfonic acid the partially chlorinated benzenesulfonic acid recovered by the process of Example III was used as the reaction medium.

*Example V*

80 parts by weight of copper phthalocyanine are charged with agitation into 700 parts by weight of anhydrous para-chloro-benzene-sulfonic acid at 100° C. After the mixture has become completely homogeneous 10 parts by weight of sulfur monochloride and 5 parts by weight of anhydrous cupric chloride are added. Chlorine is then passed through the reaction mass for six hours during which the temperature is slowly raised to 120° C. The batch is drowned in water held at 60° C. This is thoroughly stirred for two hours during which the temperature is raised to 80° C. The finely subdivided pigment is then filtered off and the partially chlorinated para-chloro-benzene-sulfonic acid recovered by partial concentration of the filtrate with subsequent crystallization or by complete evaporation of the filtrate. Analysis shows the pigment to contain 49% chlorine corresponding to 15 chlorine atoms per molecule with a yield being 93.5% of the theoretical yield.

*Example VI*

The process of Example V was followed with the single exception that instead of the use of anhydrous para-chlorobenzenesulfonic acid the partially chlorinated chlorobenzenesulfonic acid recovered by the process of Example V was used as the reaction medium.

*Example VII*

The process of Example V was followed with the single exception that instead of the use of anhydrous para-chlorobenzenesulfonic acid ortho-nitro-benzenesulfonic acid was used as the reaction medium.

*Example VIII*

60 parts by weight of copper phthalocyanine are charged with agitation into 600 parts by weight of anhydrous naphthalene monosulfonic acid consisting essentially of the beta isomer but also containing alpha isomer impurities which is fluid at 110° C. and which has been previously treated to remove any moisture therefrom. After the mixture has become completely homogeneous, 5 grams of bromine, 20 grams of sulfur and 10 grams of anhydrous ferric chloride are added. Chlorine is then passed through the reaction mass for six hours during which the temperature is kept at 110° C. The reaction mass is then poured into water held at 80° C. and then filtered as explained in the other examples. The partially chlorinated naphthalene sulfonic acid is recovered from the filtrate by evaporation.

*Example IX*

The process of Example VIII was followed with the single exception that instead of using the anhydrous naphthalene monosulfonic acid consisting essentially of the beta isomer but also containing alpha isomer impurities the partially chlorinated naphthalenesulfonic acid recovered by the process of Example VIII was used as the reaction medium.

The examples given above, it will be understood, are merely illustrative. The details of the procedure may be varied within wide limits of temperature within the ranges given. Conditions at drowing the reaction mixture and the use of surface active agents and other coating materials to condition the pigment for various uses may also vary widely according to practices known in the art.

While these examples refer to the yellowish green pigment obtained by introducing a large number of chlorine atoms, the chlorination may be stopped at any desired degree, so as to produce intermediate shades varying from greenish blue to yellowish green hues and averaging .5–15 atoms of chlorine per chlorinated copper phthalocyanine molecule.

It is understood that this process is not limited to the use of halogen free copper phthalocyanine, but copper phthalocyanine with some chlorine therein may also be used as a starting material, such as those obtained by the copper phthalocyanine synthesis from mono and dichlorphthalic anhydrides.

Having thus described our invention, what we claim is:

1. A process for manufacturing a green coloring matter which comprises charging with agitation 60 to 80 parts by weight of copper phthalocyanine into a reaction medium comprising 600 to 700 parts by weight of an organic sulfonic acid which does not form an oxidizing system in the presence of chlorine having a melting point below 120° C. and a boiling point above 128° C. and adding thereto a chlorination catalyst, then passing chlorine through the reaction mass so formed while maintaining the same at a temperature between 110° C. and 120° C. for two to six hours and finally drowning the reaction mass in a large amount of water, filtering out the precipitate and recovering the acid from said filtrate by acidizing a water soluble salt of said acid.

2. In a process for chlorinating copper phthalocyanine, the improvement of performing the reaction by forming at a temperature no higher than 110° C. a solution of copper phthalocyanine in a reaction medium comprising an organic sulfonic acid which does not form an oxidizing system in the presence of chlorine having a melting point below 120° C. and a boiling point above 120° C., adding thereto a chlorination catalyst, passing chlorine through said reaction mass while maintaining said solution at temperatures between 110° C. and 120° C. and then drowning the reaction mass in cold water thus precipitating a green pigment containing from 12 to 15 atoms of chlorine and no atoms of sulfur per copper phthalocyanine molecule.

3. In a process for chlorinating copper phthalocyanine, the improvement of performing the reaction by forming a liquid homogeneous solution of copper phthalocyanine in a reaction medium comprising an organic sulfonic acid which does not form an oxidizing system in the presence of chlorine having a melting point below 120° C. and a boiling point above 120° C. at temperatures between 60° C. and 110° C. adding thereto a chlorination catalyst, chlorinating said copper phthalocyanine by passing chlorine through said reaction mass while gradually raising the same to a temperature not over 120° C. over a period of from two to six hours, precipitating the green pigment so formed by drowning the reaction mass in cold water, filtering out said precipitates and recovering said partially chlorinated organic sulfonic acid from the filtrate by forming a water soluble salt thereof and acidifying said salt.

4. In a process for chlorinating copper phthalocyanine, the improvement of performing the reaction by dissolving copper phthalocyanine in a reaction medium comprising an organic sulfonic acid which does not form an oxidizing system in the presence of chlorine having a melting point below 120° C. and a boiling point above 120° C. at a temperature at which said acid is liquid, adding thereto a chlorination catalyst, then passing chlorine through the reaction mass so formed while maintaining the same at temperatures not above 120° C., then cooling the reaction mass to 60° C., drowning the same in water and finally filtering, washing and drying the chlorined substantially sulfur-free copper phthalocyanine precipitate and recovering said partially chlorinated organic sulfonic acid from the filtrate by forming a water soluble salt thereof and acidifying said salt.

5. In a process for chlorinating copper phthalocyanine, the improvement of performing the reaction by dissolving copper phthalocyanine in a reaction medium comprising an organic sulfonic acid which does not form an oxidizing system in the presence of chlorine having a melting point below 120° C. and a boiling point above 120° C. at a temperature at which said acid is liquid and adding a chlorination catalyst thereto, then passing chlorine through the reaction mass so formed while maintaining it at a temperature not above 120° C. until the said reaction mass yields a chlorinated copper phthalocyanine precipitate in water containing 12 to 15 atoms of chlorine and no atoms of sulfur per molecule, filtering out said precipitate and recovering said partially chlorinated organic sulfonic acid from the filtrate by forming a water soluble salt thereof and acidifying said salt.

6. In a process for chlorinating copper phthalocyanine, the improvement of performing the reaction by chlorinating a homogeneous solution of copper phthalocyanine in a reaction medium comprising an organic sulfonic acid which does not form an oxidizing system in the presence of chlorine having a melting point below 120° C. and a boiling point above 120° C. in the presence of a chlorination catalyst at temperatures not over 120° C., drowning the reaction mass in cold water, filtering out the precipitate and recovering said partially chlorinated organic sulfonic acid from said filtrate by forming a water soluble salt thereof and acidifying said salt.

References Cited in the file of this patent
UNITED STATES PATENTS 2,647,126    Pugin _____ July 28, 1953
2,662,085    Holtzman et al. _____ Dec. 8, 1953